(12) United States Patent
Meekhof et al.

(10) Patent No.: US 11,423,585 B2
(45) Date of Patent: Aug. 23, 2022

(54) VELOCITY-BASED CONTROLS

(71) Applicant: Microsoft Technology Licensing, LLC, Redmond, WA (US)

(72) Inventors: Casey Leon Meekhof, Redmond, WA (US); Kyle Nicholas San, Bellevue, WA (US); Julia Schwarz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/107,784

(22) Filed: Nov. 30, 2020

(65) Prior Publication Data
US 2022/0172405 A1 Jun. 2, 2022

(51) Int. Cl.
| | |
|---|---|
| *G06T 11/00* | (2006.01) |
| *G06F 3/041* | (2006.01) |
| *G06F 3/04842* | (2022.01) |
| *G06F 3/04883* | (2022.01) |

(52) U.S. Cl.
CPC .......... *G06T 11/00* (2013.01); *G06F 3/04166* (2019.05); *G06F 3/04842* (2013.01); *G06F 3/04883* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,767,613 B1* | 9/2017 | Bedikian | G06F 1/1684 |
| 2012/0162117 A1* | 6/2012 | Wilson | A63F 13/214 |
| | | | 345/173 |
| 2013/0069985 A1 | 3/2013 | Wong et al. | |
| 2015/0103004 A1* | 4/2015 | Cohen | G06F 3/04815 |
| | | | 345/158 |
| 2015/0346701 A1* | 12/2015 | Gordon | H04L 12/2809 |
| | | | 700/275 |
| 2016/0320860 A1* | 11/2016 | Josephson | G06F 3/04845 |
| 2018/0157398 A1* | 6/2018 | Kaehler | G06F 3/013 |
| 2020/0097071 A1* | 3/2020 | Johnston | G06F 3/011 |

FOREIGN PATENT DOCUMENTS

WO 2017100406 A1 6/2017

OTHER PUBLICATIONS

"International Search Report and Written Opinion Issued in PCT Application No. PCT/US21/058501", dated Feb. 22, 2022, 12 Pages.

* cited by examiner

*Primary Examiner* — Edward Martello
(74) *Attorney, Agent, or Firm* — Alleman Hall Creasman & Tuttle LLP

(57) ABSTRACT

Examples that relate to virtual controls in a mixed reality experience are described. One example provides a method comprising, via a mixed reality display device, displaying mixed reality content including a representation of a virtual control, and receiving sensor data indicating motion of a user digit. The method further comprises, based at least in part on the sensor data, determining a velocity of the user digit, and responsive to determining that the velocity of the user digit relative to a surface corresponding to the virtual control satisfies a velocity-based selection condition, triggering the virtual control.

20 Claims, 11 Drawing Sheets

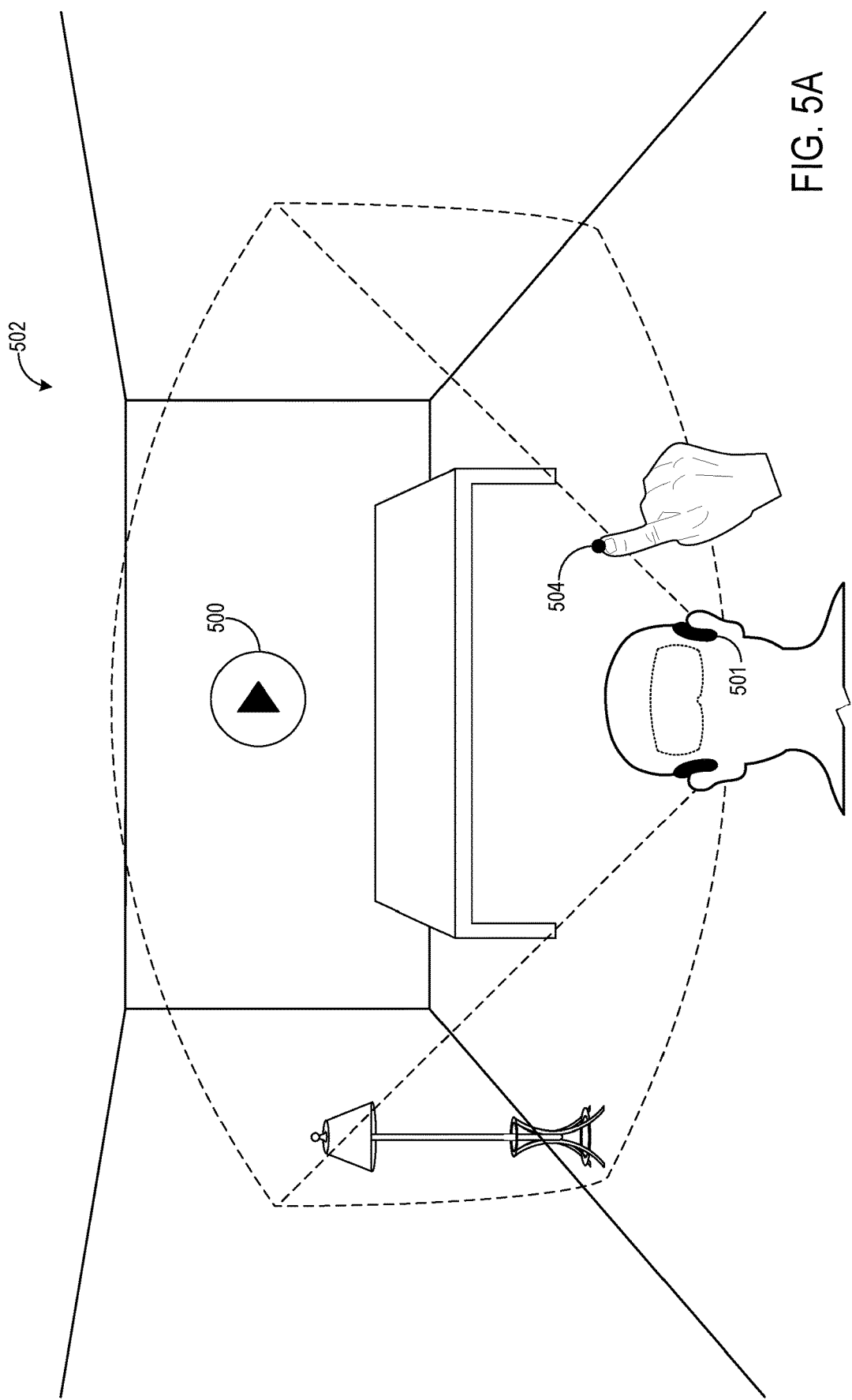

VELOCITY-BASED CONTROLS

BACKGROUND

A typical mixed reality experience augments a view of a surrounding physical environment with virtual imagery projected onto or otherwise mixed with the view of the physical environment. Some mixed reality systems support hand tracking to enable users to provide input via hand manipulation.

BRIEF DESCRIPTION OF THE DRAWINGS

FIG. 5A-5B illustrate use of different example conditions used to trigger a virtual control.

DETAILED DESCRIPTION

Figure 1A:
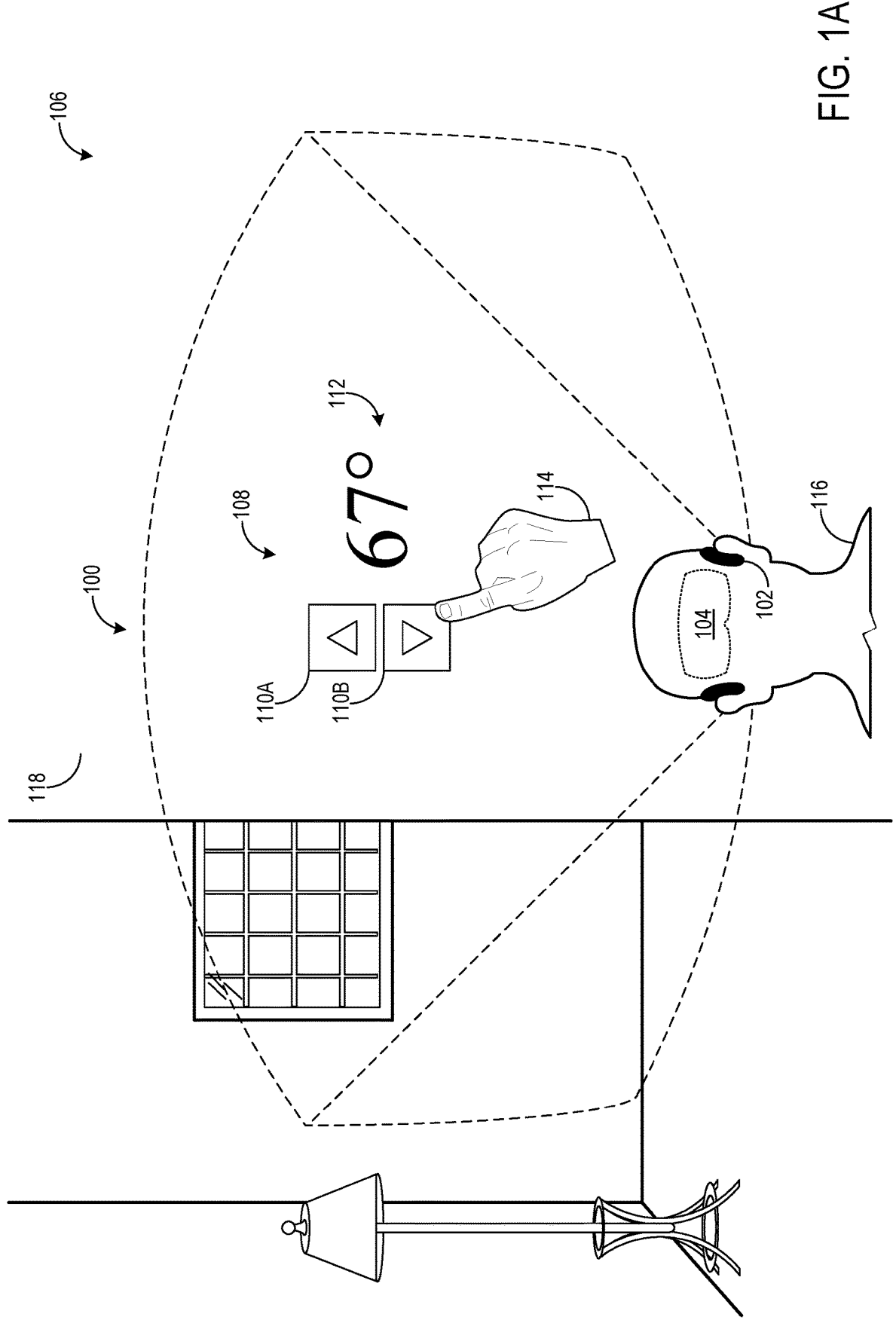
FIGS. 1A-1B show an example mixed reality experience presented in a physical environment.

FIG. 1A depicts an example mixed reality experience 100 presented on a head-mounted display (HMD) device 102. HMD device 102 includes an at least partially transparent display 104 through which a view of the surrounding physical environment 106 is visible. Additionally, HMD device 102 uses display 104 to render mixed reality content (i.e., virtual imagery) that is overlaid upon or otherwise augments the view of physical environment 106. As such, HMD device 102 may be referred to as a mixed reality display device. The mixed reality content rendered on display 104 includes a user interface 108 having virtual controls 110A and 110B, and a temperature reading 112. In this example, virtual controls 110 are selectable to alter the setting of a thermostat—indicated by reading 112—located in physical environment 106 and thereby control the temperature in the physical environment. The thermostat may be communicatively coupled to HMD device 102 via a wireless communication link, for example.

HMD device 102 implements a hand tracking pipeline that enables user 116 to provide input by manipulating their hand 114. In an example implementation of hand tracking, an imaging system on-board or off-board HMD device 102 captures image frames of the surrounding environment. Where hand 114 is within the field of view of the imaging system, the posture, motion, and/or other aspects of the hand may be captured in one or more image frames and analyzed to determine an input. For example, hand 114 may be imaged to determine the position of the tip of the index finger of user 116, where the fingertip position may be used to control a cursor, detect selection of virtual controls 110, and/or derive any other suitable information. Further detail regarding hand tracking and image sensing is described below with reference to FIG. 6.

Figure 1B:
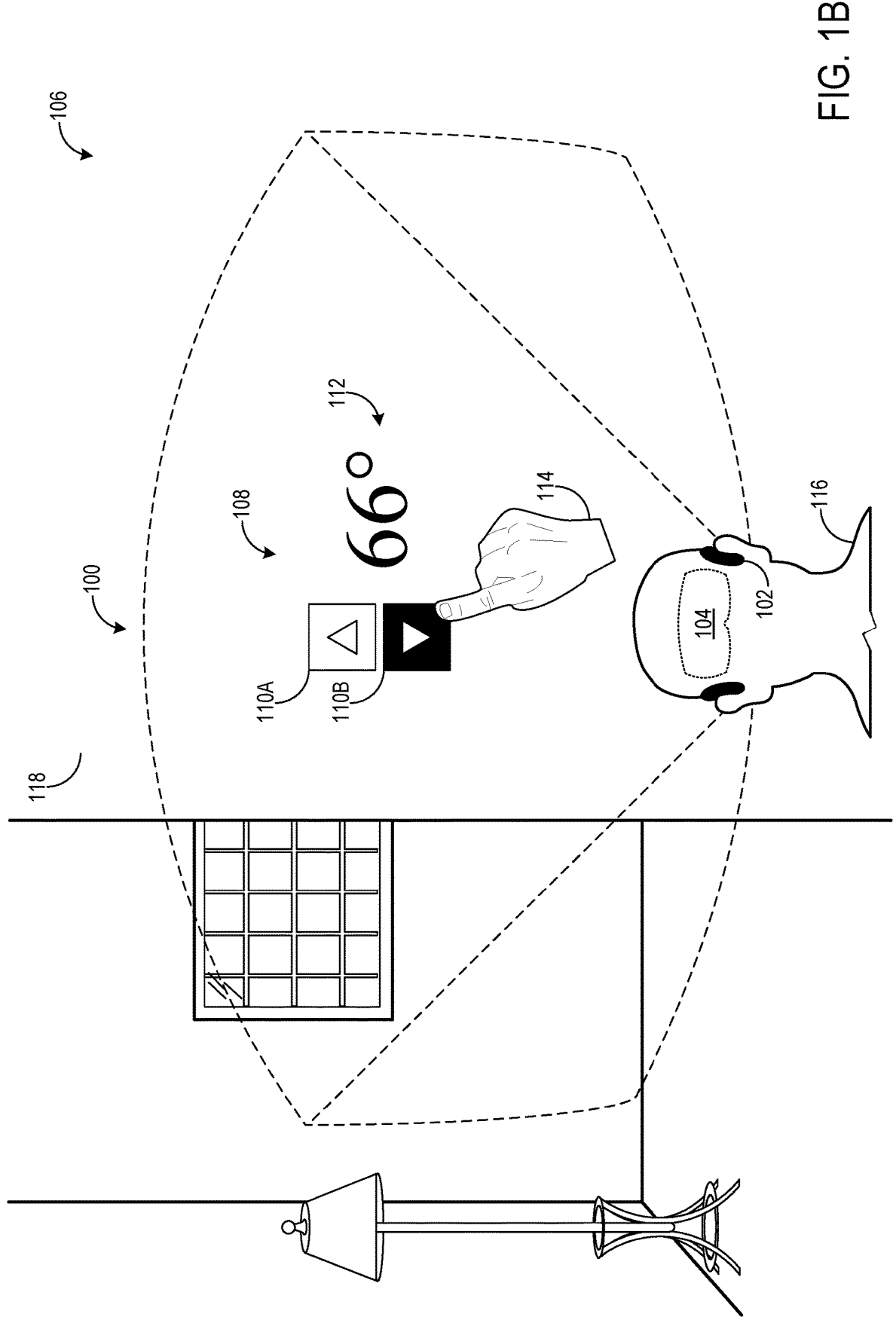

HMD device 102 analyzes sensed aspects of hand 114 to determine whether a selection condition defined for virtual controls 110 is satisfied. As described in further detail below with reference to FIG. 3A, the selection condition stipulates one or more criteria that, when satisfied, trigger a virtual control 110 and the execution of its corresponding functionality. FIG. 1B illustrates the satisfaction of the selection condition defined for virtual control 110B, which triggers a change in the appearance of the control, thereby providing visual feedback indicating its selection, and a decrease in thermostat reading 112 by one degree, reflecting a corresponding change in the thermostat setting in physical environment 106.

One mechanism for triggering virtual controls in software applications that support hand tracking or otherwise receive hand-based input looks for collisions between the hand and a control. As used herein, a "collision" between an input device and a virtual control refers to the colocation, intersection, overlap, and/or occupancy of a substantially common location in space by the input device and control as determined by the position of the input device and the geometric or spatial extent of the virtual control. As an example, a collision-based trigger mechanism may trigger a virtual control upon detecting a collision between a hand joint (e.g., a joint of a virtual skeletal model representing the hand such as a fingertip joint) and a geometric representation of the control (e.g., a box or other shape bounding the control). Where another body part, or a peripheral accessory (e.g., handheld controller) is instead designated as an input device, collisions between the designated input device and the geometric representation of the control may be detected. Such collision-based mechanisms for triggering controls may provide sufficient results when applied to controls that are not displayed as being attached to a physical surface. Collision-based mechanisms may prove unsuitable for controls that are displayed as being attached to physical surface, however.

Virtual controls 110 represent one such example of a virtual control displayed as being attached to a physical surface. As used herein, mixed reality content such as a virtual control being "attached" to a physical surface refers to the content being displayed at a substantially fixed location relative to the physical surface even as a user perceiving the content alters their gaze direction, head direction, or position in the surrounding physical environment. However, in some examples "attached" may refer to mixed reality content that is attached to a physical surface yet permitted to vary in position in one or two dimensions. For example, a virtual control may be displayed at a substantially fixed distance from a physical surface (e.g., in the normal direction of the surface) yet be slidable along the surface in the length and/or width dimensions of the surface. In some examples, attaching a virtual control to a surface may include setting (or attempting to set) one or more spatial coordinates describing the position of the virtual control in space to be substantially equal to corresponding spatial coordinates of the surface (e.g., as determined by imaging the surface).

To accurately attach virtual controls 110 to wall 118, a surface analysis of the wall may be performed. For example, HMD device 102 may formulate a geometric representation (e.g., point cloud, surface mesh) of wall 118 based on image data collected by an imaging system on or off-board the HMD device. However, the surface analysis process may be subject to error, for example due to noise in captured image data. This error may result in an inaccurate mapping of wall 118, which in turn may manifest in an inaccurate attachment of virtual controls 110 to wall 118.

Figure 2:
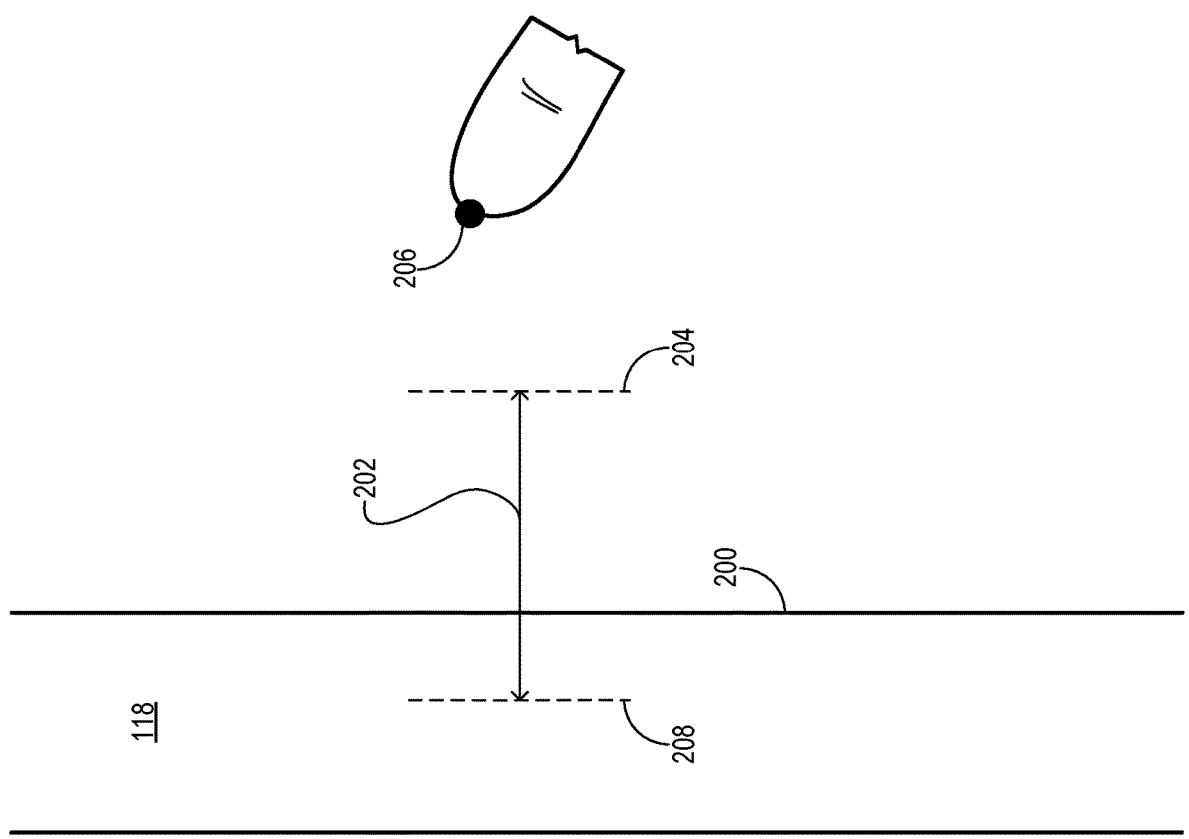
FIG. 2 shows a side view of a wall of the physical environment of FIGS. 1A-1B.

FIG. 2 illustrates an example of potential uncertainty in attaching virtual control 110B to wall 118. In this example, virtual control 110B is intended to be attached to wall 118 so as to appear substantially coplanar with the wall. For example, a developer of mixed reality experience 100 may design virtual control 110B to appear substantially coplanar with a suitable physical surface to imbue the virtual control with tangibility and realism, and potentially emulate the appearance and/or function of a real control. However, due to error in the surface analysis process, the precision with which wall 118 is mapped—or, more particularly, the precision with which the location of an exterior surface 200 of the wall is determined—is limited to a distance 202 along the normal direction of the wall. In other words, while virtual control 110B is designed to be coplanar with exterior surface 200 of wall 118, the accuracy of the attachment process is such that virtual control may be positioned anywhere within distance 202. Where the coplanar attachment of virtual control 110B to wall 118 is desired, a z-coordinate (e.g., a depth coordinate) of the control may be set to be substantially equal to a z-coordinate of the wall (e.g., as determined by surface analysis); however, where error in the attachment process exists, the z-coordinate of the wall may exhibit uncertainty to the extent represented by distance 202. Other sources of error may contribute further uncertainty to the process of attaching mixed reality content to physical surfaces, including but not limited to errors in hand tracking, eye tracking, display optics, and rendering.

As the collision-based mechanisms for triggering virtual controls described above depend upon the positions of the entities (e.g., hand joint and control representation) undergoing colocation, their use in the presence of a virtual control inaccurately attached to a physical surface may result in inaccurately triggering the virtual control in a manner that does not align with user expectation. For example, where virtual control 110B is positioned at a first end 204 of distance 204—e.g., at the farthest distance away from exterior surface 200 along the normal direction of wall 118 that is still within distance 204—collision detection between a fingertip position 206 and the control would trigger the control earlier than expected by a user who perceives the virtual control as being coplanar with the wall. This perception may arise from general expectations about virtual controls in mixed reality or how virtual control 110B is displayed, for example. Moreover, the magnitude of the uncertainty in positioning virtual control 110B—e.g., the size of distance 202—may be sufficiently small such that the virtual control appears substantially coplanar with wall 118 as perceived by user 116 even when the virtual control is located at an extreme end of the distance. Where virtual control 110B is instead positioned at a second end 208 of distance 204—at a location within wall 118 and behind exterior surface 200—collision detection would fail to trigger the virtual control as the virtual control is not reachable by the fingertip.

To address these and other issues associated with collision-based mechanisms for triggering virtual controls, and to mitigate errors that produce inaccuracy in the attachment of controls to physical surfaces, a velocity-based selection condition for triggering controls is disclosed. As described below, the velocity-based selection condition is generally defined such that a control is triggered upon detecting that the velocity of a user digit—or other designated input device—has decreased below a threshold velocity. This velocity may be measured in relation to a physical surface that the control is attached to. Further, the velocity-based selection condition may consider additional criteria in determining whether to trigger a control that relate to positional and directional aspects of the user digit.

The velocity-based trigger mechanism disclosed herein leverages observations of human behavior to provide virtual controls that align more closely with user expectations and perceptions. In particular, it has been observed that human digits—or hand-manipulated input devices—tend to exhibit certain velocity characteristics when attempting to select a virtual control. As one example, for controls attached to a physical surface, a user digit is likely to exhibit a velocity drop upon, or in anticipation of, the digit hitting the surface. Velocity drops may also be observed where users attempt to press controls not attached to a physical surface, for example due to prior experience with physical buttons. Accordingly, velocity drops may be used to infer where a user perceives a control to be positioned, and to time the actuation of a control in accordance with this user perception. Further, where an offset between the perceived location of a control and its displayed location exists, aspects of the control and/or velocity-based selection condition may be adjusted based on the offset, for example to further align control positioning and/or trigger timing with user perception and adjust the sensitivity with which controls are triggered. Accordingly, the disclosed approaches may help calibrate the process of attaching controls to physical surfaces, quantify and reduce uncertainty in the surface analysis process, and provide a user interface that adapts to user perception. As such, the user experience may be improved from the perspectives of reliability, user confidence, usability, and speed.

Figure 3A:
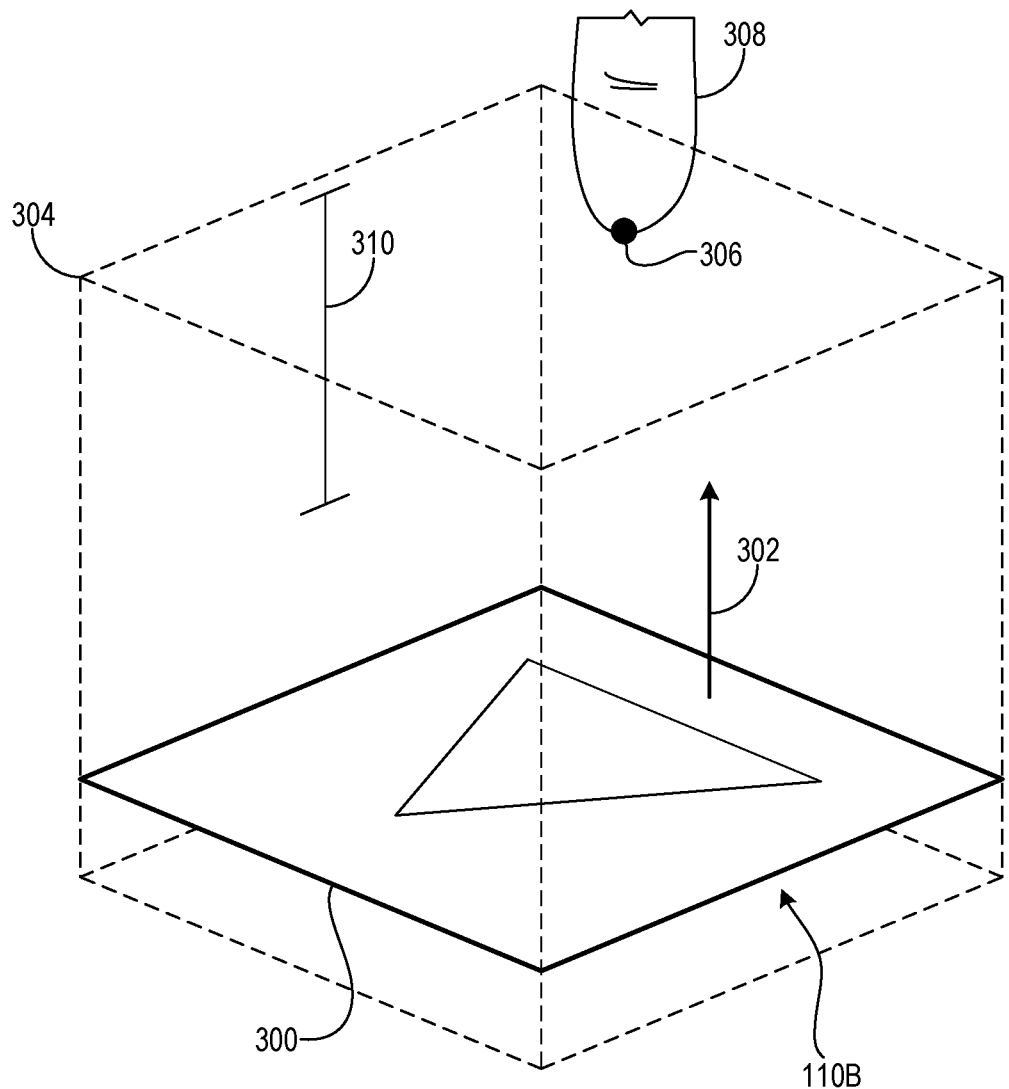
FIGS. 3A-3B illustrates the triggering of an example virtual control.

FIG. 3A illustrates how a velocity-based selection condition may be defined for, and used to selectively trigger, virtual control 110B. The velocity-based selection condition is illustrated with reference to a representation 300 of virtual control 110B, where various aspects of the representation may be used to define and/or identify satisfaction of the velocity-based selection condition. In some examples, representation 300 may encode the appearance and geometry of virtual control 110B—for example, via a three-dimensional model. The virtual controls described herein and their representations, however, may assume any suitable dimensionality and form. As examples, one or more of the following aspects of the representation 300 may be defined for subsequent trigger detection: a (e.g., three-dimensional) center position of the representation, a normal direction 302 of the representation (e.g., a normal direction of a user-facing surface of the representation), an upward direction indicating the orientation of the representation, a length of the representation, and a width of the representation.

As noted above, the velocity-based selection condition may include the velocity of a user digit (e.g., as measured in normal direction 302) decreasing below a threshold velocity—i.e., a velocity drop. In some examples, this criterion may be defined as an instantaneous velocity of the user digit being a predetermined fraction of an average velocity of the user digit. The instantaneous velocity and average velocity may be determined from any suitable number n of image frames, where n may be adjusted to tune the sensitivity of virtual control actuation and/or based on user feedback as described below. Further, the velocity of a user digit may be determined relative to, or in a reference frame corresponding to, wall 118 to which virtual control 110B is attached. Generally, velocities of a user digit or other designated input device may be measured relative to the physical surface to which the virtual control being evaluated is attached, or to a different physical surface that the virtual control is not attached to. In other examples, velocity may be measured relative to a virtual surface such as a surface of virtual control 110B (e.g., a surface of representation 300) or surface established by an application whose execution provides mixed reality experience 100. The virtual surface may be positioned in a fixed position in a physical environment, and may or may not be rendered, for example. Further, examples are possible in which a control is attached to a moving physical surface, in which case velocity may be measured relative to the moving surface.

The velocity drop criterion may be defined in other ways. For example, the velocity drop criterion may be defined in terms of acceleration—e.g., the criterion may include identifying a predetermined acceleration, identifying that the acceleration of a user digit decreases below a threshold acceleration, and/or identifying a predetermined acceleration a predetermined distance from representation 300 along normal direction 302. As another example, the velocity drop criterion may include the velocity of a user digit relative to a surface decreasing by at least a threshold rate. Generally, any suitable motional/kinematic parameters derivable from data representing motion of a user digit or other designated input device may be used to define the velocity drop criterion and the overall velocity-based selection condition. Moreover, the velocity drop criterion may include a temporal constraint such that the criterion is satisfied if the velocity drop occurs within a threshold duration.

FIG. 3A also depicts a hit zone 304 defined for virtual control 110B, where the hit zone may be used to identify satisfaction of the velocity-based selection condition defined for the control. In this example, hit zone 304 is a three-dimensional shape (e.g., cuboid) extruded from representation 300 along normal direction 302. However, a hit zone may be defined for virtual control 110B by extruding representation 300 in a direction different than normal direction 302. In other examples, a hit zone may be defined by partially extruding representation 300 along normal direction 302 or another direction. As used herein, a "partial" extrusion of a virtual control representation refers to extruding part, and not the entirety, of the representation. For example, a partial extrusion of representation 300 may include extruding a circular area of the representation and not the portion of the representation outside the circular area, which may produce a cylindrical hit zone. Any suitable method of defining a hit zone may be used, however. Moreover, hit zones that vary in time (e.g., in size, shape) are also contemplated.

In some examples, determining whether the velocity-based selection condition defined for virtual control 110B is satisfied may be responsive to whether the position of a user digit or other designated input device has entered hit zone 304. As one example, FIG. 3A depicts a fingertip position 306 of a user digit 308 within hit zone 304. Upon detecting that fingertip position 306 has entered hit zone 304, HMD device 102 may initiate an evaluation of whether the velocity-based selection condition defined for virtual control 110B is satisfied. In examples in which HMD device 102 acquires or processes a sequence of image frames, fingertip position 306 may be updated (e.g., as a three-dimensional position) each frame (or, for each frame that includes image data sufficient to determine the fingertip position) in service of determining whether satisfaction of the velocity-based selection condition should be evaluated.

The velocity-based selection condition may include the position of a user digit being within hit zone 304. For example, if fingertip position 306 enters but subsequently leaves hit zone 304, HMD device 102 may cease evaluating satisfaction of the velocity-based selection condition and potentially other processing steps (e.g., determination of user digit velocity). In other words, departures by fingertip position 306 from hit zone 304 may render the velocity-based selection condition unsatisfied. Thus, in such examples, determining that the velocity-based selection condition is satisfied may be performed while fingertip position 306 is within hit zone 304, and not while the fingertip position is outside of the hit zone. In view of this criterion and the uncertainty in positioning virtual controls relative to physical surfaces, hit zone 304 in the present example extends both above and below representation 300 so that satisfaction of the velocity-based selection condition is achievable even if fingertip position 306 is below the representation. For example, if the coplanar arrangement of virtual control 110B with wall 118 is desired, but the virtual control is instead placed some distance in front of wall 118, hit zone 304 enables satisfaction of the velocity-based selection to be detected both in cases where its criteria are satisfied with fingertip position 306 above and below representation 300. Any suitable extension of a hit zone relative to a virtual control is possible, however—for example, a hit zone may extend above and not below a control, extend below and not above a control, and may or may not envelop a control.

The velocity-based selection condition may include user digit 308 traversing at least a threshold distance 310 along normal direction 302 of representation 300 of virtual control 110B. To this end, the distance traversed along normal direction 302 inside hit zone 304 may be determined. Moreover, the velocity-based selection condition may include the primary direction of motion of user digit 308 being along normal direction 302 of representation 300. As user digit 308 is likely to undergo motion in three-dimensions, some motion in directions other than normal direction 302 may be expected; however, if the motion of the user digit is primarily in a direction other than the normal direction, this may indicate a user intent to perform some action other than triggering virtual control 110B. Thus, defining the velocity-based selection condition to include user digit motion being primarily along normal direction 302 may filter out such intent that might otherwise be recognized as a false positive. The motion of user digit 308 on a per-direction basis may be determined and compared in any suitable manner. For example, a vector representing the average motion of user digit 308 in hit zone 304 may be computed as well as its directional components (e.g., component along normal direction 302 and two perpendicular directions). In this example, motion of user digit 308 may be considered primarily along normal direction 302 if the component of the vector in the normal direction is greater than the other components. As another example, an angle threshold may be applied to the motion of user digit 308 to separate motion directed toward virtual control 110B from motion directed elsewhere.

In some examples, the velocity-based selection condition may include all of the criteria described above. Thus, in such examples the velocity-based selection condition is satisfied upon determining that (i) the velocity of a user digit has decreased below a threshold velocity (e.g., the instantaneous velocity of the user digit has become a predetermined fraction of an average velocity of the user digit), (ii) the position of the user digit has remained within a corresponding hit zone, (iii) the user digit has traversed at least a threshold distance along a normal direction of the representation of the corresponding virtual control, and (iv) the primary direction of motion of the user digit is along a normal direction of the representation of the virtual control. For example, the actuation virtual control 110B and execution of its corresponding functionality may be prompted by satisfaction of criteria (i)-(iv) as determined in relation to representation 300 of the control, normal direction 302, hit zone 304, fingertip position 306, user digit 308, and threshold distance 310. The evaluation of criteria (i)-(iv) may be implemented in any suitable manner such as via respective classifiers.

Figure 3B:
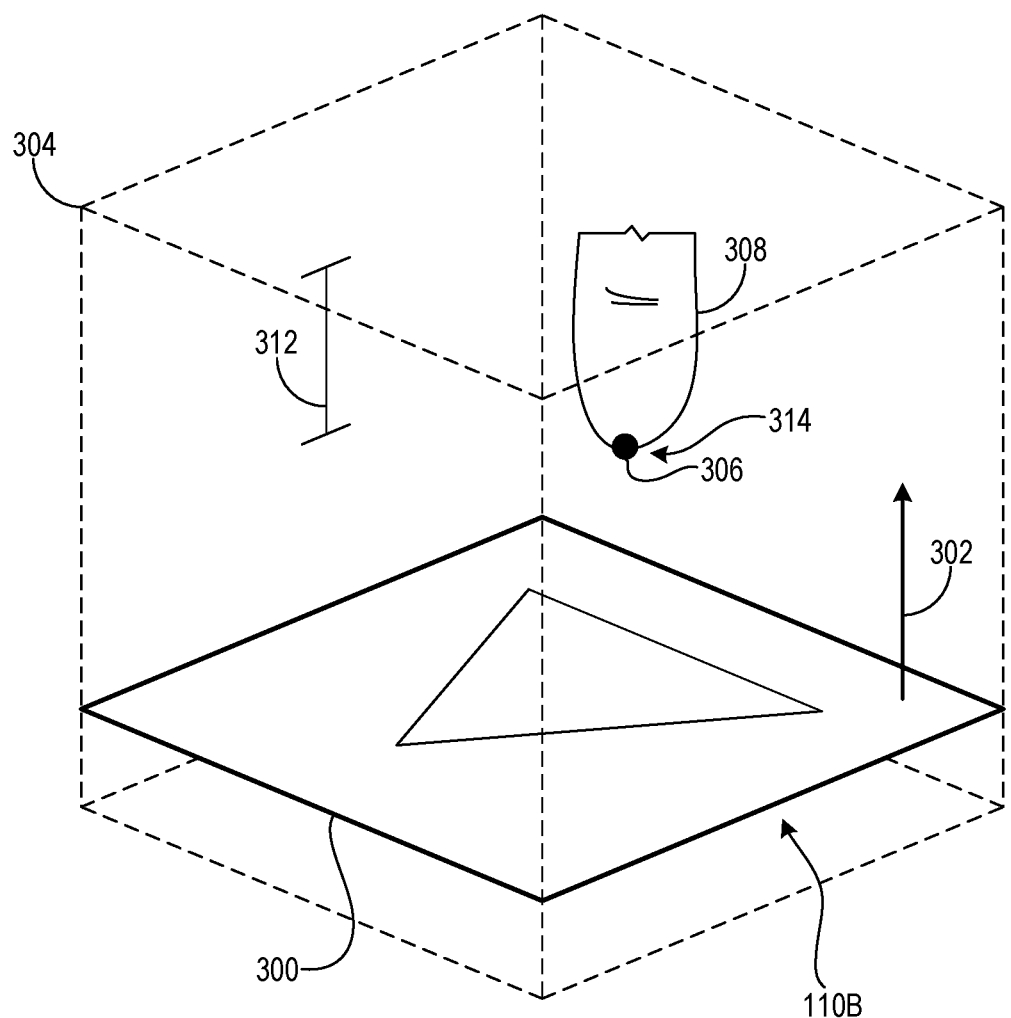

In some examples, after triggering virtual control 110B, the ability to subsequently trigger virtual control 110B may be contingent upon satisfying a reset condition defined for the virtual control. In other words, in such examples virtual control 110B may not be triggerable until the reset condition is satisfied. FIG. 3B illustrates an example reset condition defined for virtual control 110B, where the reset condition includes a user digit or other designated input device traversing at least a threshold release distance 312 away from representation 300 in normal direction 302. In this example, release distance 312 is measured from a location 314 at which fingertip position 306 was closest to representation 300 while in hit zone 304. Upon satisfying the reset condition, virtual control 110B may be reset to an idle state in which the virtual control is triggerable (e.g., as illustrated by the state of the control depicted in FIG. 1A). In some examples, the reset condition may be defined such that virtual control 110B is reset to the idle state if fingertip position 306 exits hit zone 304.

The mechanisms described above for controlling the state and behavior of virtual control 110B may be implemented in any suitable manner. As one example, these mechanisms may be implemented in a state machine having three states: (i) an idle state, (ii) an evaluation state, and (iii) a reset state. Virtual control 110B may be initially placed in the idle state in which fingertip position 306 is evaluated. If fingertip position 306 enters hit zone 304, virtual control 110B may transition to the evaluation state in which it may be determined whether the velocity-based selection condition is satisfied. If the velocity-based selection condition is satisfied, virtual control 110B may enter the reset state in which it may be determined whether the reset condition is satisfied. If the reset condition is satisfied, virtual control 110B may transition to the idle state.

As described above, the location of a virtual control perceived by a user may be inferred from various characteristics of their user input. For example, the position of a user digit at which the velocity-based selection condition becomes satisfied may be substantially inferred as the location of a virtual control as perceived by the user. This perceived location may be compared to the displayed location of the virtual control to determine an offset that may be used to more closely aligning control behavior to user perception.

Figure 4:
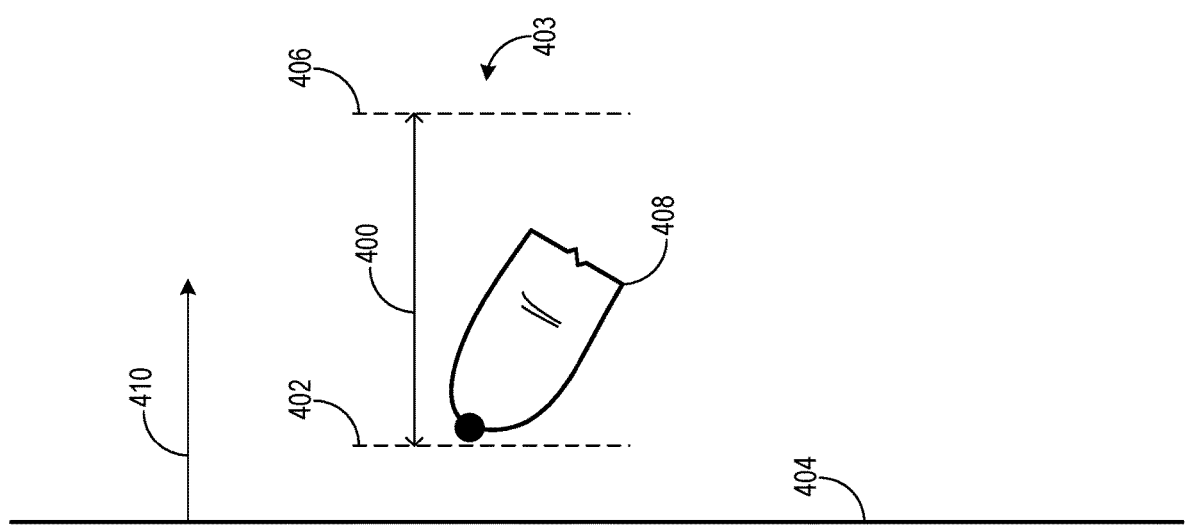
FIG. 4 illustrates the determination of an example offset between perceived and displayed locations of a virtual control.

FIG. 4 shows an example offset 400 determined between a perceived location 402 of a virtual control 403 attached to a surface 404 and a displayed location 406 of the virtual control. In this example, perceived location 402 is inferred from the motion of a user digit 408—for example, the perceived location may be inferred as substantially the position at which a velocity drop is detected as described above. Offset 400 then may be determined as the distance—along a normal direction 410 of surface 404—between perceived location 402 and displayed location 406.

To align the behavior of virtual control 403 more closely to the inferred user perception, various aspects of the virtual control may be adjusted based on offset 400. For example, the displayed location 406 of a representation of virtual control 403 may be adjusted—e.g., so that the displayed location substantially matches perceived location 402. Alternatively or additionally, one or more criteria or aspects related to the velocity-based selection condition defined for virtual control 403 may be adjusted based on offset 400—for example, a position of a hit zone defined for the virtual control, a size of the hit zone, the threshold velocity, the predetermined ratio/fraction of instantaneous velocity to average velocity of user digit 408, the threshold distance along normal direction 410 to be traversed by the user digit, and/or the degree to which the component of user digit motion along the normal direction exceeds components in other directions (e.g., by adjusting the angle threshold described above). Further, a release distance (e.g., release distance 312) defined for the hit zone assigned to virtual control 403 may be adjusted based on user feedback. For example with an initial release distance set to 1.5 cm, if virtual control 403 is placed 2 cm from surface 410, and the virtual control is successfully triggered with the position of user digit 408 being 1 cm away from the surface, the release distance may be adjusted to 0.5 cm. Generally, a release distance may be adjusted based on the closest distance achieved by a user digit to a virtual control along the normal direction of the control.

In some examples, one or more of these adjustments based on offset 400 may be iterative—for example, an offset may be determined between perceived and displayed locations of a virtual control, followed by an adjustment to the displayed location, followed by a determination of another offset, finally followed by another adjustment to the displayed location. Yet further adjustments to the displayed location may be made in this manner. Adjustments to other parameters/criteria may be made in an iterative manner based on multiple inferences of user perception/intent.

Various other parameters/criteria may be adjusted to change the sensitivity with which a virtual control is triggered and control the rate of true and false positive indications of control actuation. Adjusting the trigger sensitivity may render a virtual control less or more difficult to trigger. Examples of parameters that may be adjusted include but are not limited to the number of image frames used to determine an average direction (e.g., as a vector) of user digit motion, the number of image frames used to determine an average velocity of a user digit, and the number of image frames used to determine an instantaneous velocity of a user digit, potentially in addition to the parameters/criteria described above as being adjustable. As one example of the effect of such adjustment, a virtual control may be made easier to trigger by changing the predetermined fraction of instantaneous velocity to average velocity from approximately $\frac{1}{5}$ to $\frac{1}{3}$.

In some examples, a virtual control not attached to a physical surface may be triggered according to a velocity-based selection condition as described herein. Alternatively or additionally, a virtual control not attached to a physical surface may be triggered according to a position-based selection condition. As an example, FIG. 5A depicts a virtual control 500 presented on an HMD device 501 that is not attached to a physical surface in a physical environment 502, but instead appears to float in the physical environment. Virtual control 500 may be triggered upon detecting satisfaction of a position-based selection condition, which may include a fingertip position 504 (or the position of another designated input device) entering a hit zone defined for the virtual control.

Figure 5B:
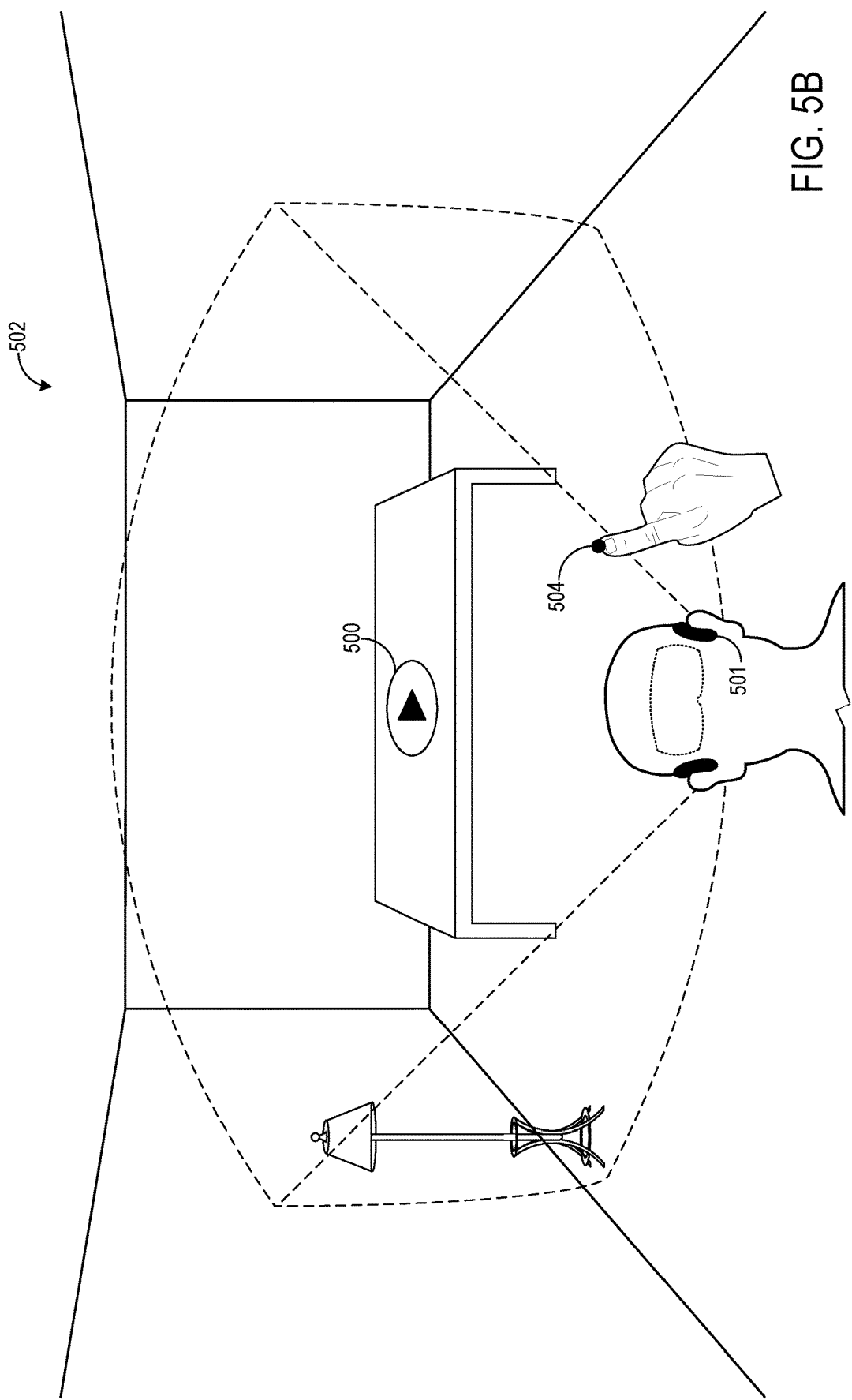

In some examples, one of the velocity-based selection condition and the position-based selection condition may be used to determine whether to trigger virtual control 500 based on its attachment or lack of attachment to a physical surface. For example, HMD device 501 may determine that virtual control 500 is not attached to a physical surface (e.g., by analyzing user input, inferring user intent, analyzing physical environment 502) and, responsive to such determination, use the position-based selection condition to effect triggering of the virtual control. As shown in FIG. 5B, virtual control 500 is attachable and detachable (e.g., via user input) to physical surfaces. In this example, HMD device 501 may determine that virtual control is attached to a physical surface (e.g., table surface 506), and, responsive to such determination, use the velocity-based selection condition to effect triggering of the virtual control. Generally, HMD device 501 may utilize surface recognition, object recognition, and/or any other suitable techniques to identify the attachment or lack of attachment of a virtual control to a surface in general or to a particular type of surface, and to select one of the velocity-based and position-based selection conditions accordingly. Further, object recognition may be used to position a virtual control on a recognized object.

Figure 6:
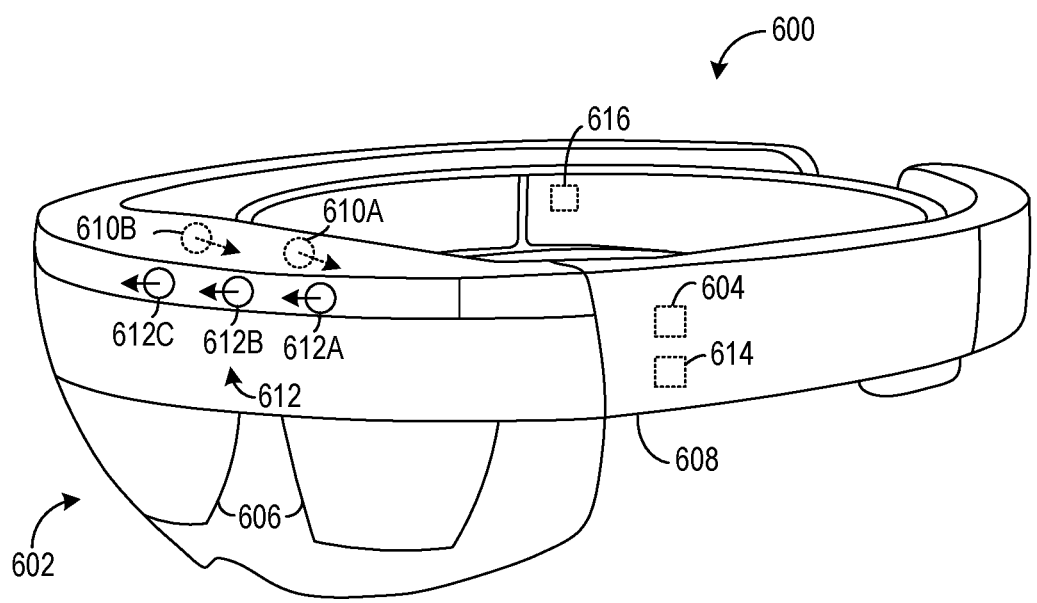
FIG. 6 illustrates an example head-mounted display device.

FIG. 6 shows an example HMD device 600. HMD device 600 includes a near-eye display 602 configured to present any suitable type of visual experience. In some examples, display 602 is substantially opaque, presenting virtual imagery as part of a virtual reality experience in which a wearer of HMD device 600 is completely immersed in the virtual reality experience. In other implementations, display 602 is at least partially transparent, allowing a user to view presented virtual imagery along with a real-world background viewable through the display to form an augmented reality experience, such as a mixed reality experience. In some examples, the opacity of display 602 is adjustable (e.g. via a dimming filter), enabling the display to function both as a substantially opaque display for virtual reality experiences and as a see-through display for augmented reality experiences. HMD device 600 may represent any of the HMD devices described herein. For example, functionality described above in connection with an HMD device, including but not limited to triggering virtual controls according to velocity-based and/or position-based selection conditions, may be implemented via HMD device 600.

In augmented reality implementations, display 602 may present augmented reality objects that appear display-locked and/or world-locked. A display-locked augmented reality object may appear to move along with a perspective of the user as a pose (e.g. six degrees of freedom (DOF): x/y/z/yaw/pitch/roll) of HMD device 600 changes. As such, a display-locked, augmented reality object may appear to occupy the same portion of display 602 and may appear to be at the same distance from the user, even as the user moves in the surrounding physical space. A world-locked, augmented reality object may appear to remain in a fixed location in the physical space, even as the pose of HMD device 600 changes. In some examples, a world-locked object may appear to move in correspondence with movement of a real, physical object. In yet other examples, a virtual object may be displayed as body-locked, in which the object is located to an estimated pose of a user's head or other body part.

HMD device 600 may take any other suitable form in which a transparent, semi-transparent, and/or non-transparent display is supported in front of a viewer's eye(s). Further, examples described herein are applicable to other types of display devices, including other wearable display devices and non-wearable display devices such as a television, monitor, mobile device display, and head-up display. In some examples, a display device including a non-transparent display may be used to present virtual imagery. Such a display device may overlay virtual imagery (e.g. virtual controls) on a real-world background presented on the display device as sensed by an imaging system.

Any suitable mechanism may be used to display images via display 602. For example, display 602 may include image-producing elements located within lenses 606. As another example, display 602 may include a liquid crystal on silicon (LCOS) device or organic light-emitting diode (OLED) microdisplay located within a frame 608. In this example, the lenses 606 may serve as, or otherwise include, a light guide for delivering light from the display device to the eyes of a wearer. In yet other examples, display 602 may include a scanning mirror system (e.g. a microelectromechanical display) configured to scan light from a light source in one or more directions to thereby form imagery. In some examples, eye display 602 may present left-eye and right-eye imagery via respective left-eye and right-eye displays.

HMD device 600 includes an on-board computer 604 operable to perform various operations related to receiving user input (e.g. voice input and gesture recognition, eye gaze detection), capturing and/or processing sensor data (e.g., image data) capturing motion of a user digit, user hand, or other designated input device, evaluating velocity-based and/or position-based selection conditions, and selectively triggering virtual controls based on satisfaction of the condition(s). In some implementations, some to all of the computing functions described above may be performed off-board. Example computer hardware is described in more detail below with reference to FIG. 8.

HMD device 600 may include various sensors and related systems to provide information to on-board computer 604. Such sensors may include, but are not limited to, one or more inward facing image sensors 610A and 610B and/or one or more outward facing image sensors 612A, 612B, and 612C of an imaging system 612, an IMU 614, and one or more microphones 616 such as a directional microphone array. The one or more inward facing image sensors 610A, 610B may acquire gaze tracking information from a wearer's eyes (e.g. sensor 610A may acquire image data for one of the wearer's eye and sensor 610B may acquire image data for the other of the wearer's eye). One or more such sensors may be used to implement a sensor system of HMD device 600, for example.

Where gaze-tracking sensors are included, on-board computer 604 may determine gaze directions of each of a wearer's eyes in any suitable manner based on the information received from the image sensors 610A, 610B. The one or more inward facing image sensors 610A, 610B, and on-board computer 604 may collectively represent a gaze detection machine configured to determine a wearer's gaze target or gaze direction on display 602. In other implementations, a different type of gaze detector/sensor may be employed to measure one or more gaze parameters of the user's eyes. Examples of gaze parameters measured by one or more gaze sensors that may be used by on-board computer 604 to determine an eye gaze sample may include an eye gaze direction, head orientation, eye gaze velocity, eye gaze acceleration, and/or change in angle of eye gaze direction. In some implementations, gaze tracking may be recorded independently for both eyes.

Imaging system 612 may collect image data (e.g. images frames) of a surrounding physical space in any suitable form. Image data collected by imaging system 612 may be used to measure physical attributes of the surrounding physical space. While the inclusion of three image sensors 612A-612C in imaging system 612 is shown, the imaging system may implement any suitable number of image sensors. As examples, imaging system 612 may include a pair of greyscale cameras (e.g. arranged in a stereo formation) configured to collect image data in a single color channel. Alternatively or additionally, imaging system 612 may include one or more color cameras configured to collect image data in one or more color channels (e.g. RGB) in the visible spectrum. Alternatively or additionally, imaging system 612 may include one or more depth cameras configured to collect depth data. In one example, the depth data may take the form of a two-dimensional depth map having a plurality of depth pixels that each indicate the depth from a corresponding depth camera (or other part of HMD device 600) to a corresponding surface in the surrounding physical space. A depth camera may assume any suitable form, such as that of a time-of-flight depth camera or a structured light depth camera. Alternatively or additionally, imaging system 612 may include one or more infrared cameras configured to collect image data in the infrared spectrum. In some examples, an infrared camera may be configured to function as a depth camera. In some examples, one or more cameras may be integrated in a common image sensor—for example, an image sensor may be configured to collect RGB color data and depth data.

Data from imaging system 612 may be used by on-board computer 604 to detect movements, such as gesture-based inputs or other movements performed by a wearer, person, or physical object in the surrounding physical space. In some examples, HMD device 600 may capture digit/hand motion performed by a wearer by acquiring image data via imaging system 612 that captures the motion. In some example, HMD device 600 may formulate articulated hand tracking data based on image data acquired via imaging system 612. HMD device 600 may also image input devices and other objects manipulated by hand motion via imaging system 612. Data from imaging system 612 may be used by on-board computer 604 to determine direction/location and orientation data (e.g. from imaging environmental features) that enables position/motion tracking of HMD device 600 in the real-world environment. In some implementations, data from imaging system 612 may be used by on-board computer 604 to construct still images and/or video images of the surrounding environment from the perspective of HMD device 600. In some examples, HMD device 600 may utilize image data collected by imaging system 612 to perform simultaneous localization and mapping (SLAM) of the surrounding physical sp ace.

IMU 614 may be configured to provide position and/or orientation data of HMD device 600 to on-board computer 604. In one implementation, IMU 614 may be configured as a three-axis or three-degree of freedom (3DOF) position sensor system. This example position sensor system may, for example, include three gyroscopes to indicate or measure a change in orientation of HMD device 600 within three-dimensional space about three orthogonal axes (e.g. roll, pitch, and yaw).

In another example, IMU 614 may be configured as a six-axis or six-degree of freedom (6DOF) position sensor system. Such a configuration may include three accelerometers and three gyroscopes to indicate or measure a change in location of HMD device 600 along three orthogonal spatial axes (e.g. x/y/z) and a change in device orientation about three orthogonal rotation axes (e.g. yaw/pitch/roll). In some implementations, position and orientation data from imaging system 612 and IMU 614 may be used in conjunction to determine a position and orientation (or 6DOF pose) of HMD device 600. In yet other implementations, the pose of HMD device 600 may be computed via visual inertial SLAM.

HMD device 600 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g. visible light cameras, infrared light cameras, time-of-flight depth cameras, structured light depth cameras, etc.), communication devices (e.g. WIFI antennas/interfaces), etc.

The one or more microphones 616 may be configured to collect audio data from the surrounding physical space. Data from the one or more microphones 616 may be used by on-board computer 604 to recognize voice commands provided by the wearer to control the HMD device 600. In some examples, HMD device 600 may record audio data via the one or more microphones 616 by capturing speech uttered by a wearer.

While not shown in FIG. 6, on-board computer 604 may include a logic subsystem and a storage subsystem holding instructions executable by the logic subsystem to perform any suitable computing functions. For example, the storage subsystem may include instructions executable to implement one or more of image frame acquisition and/or processing, hand tracking, evaluating selection conditions, and selectively triggering virtual controls.

Figure 7:
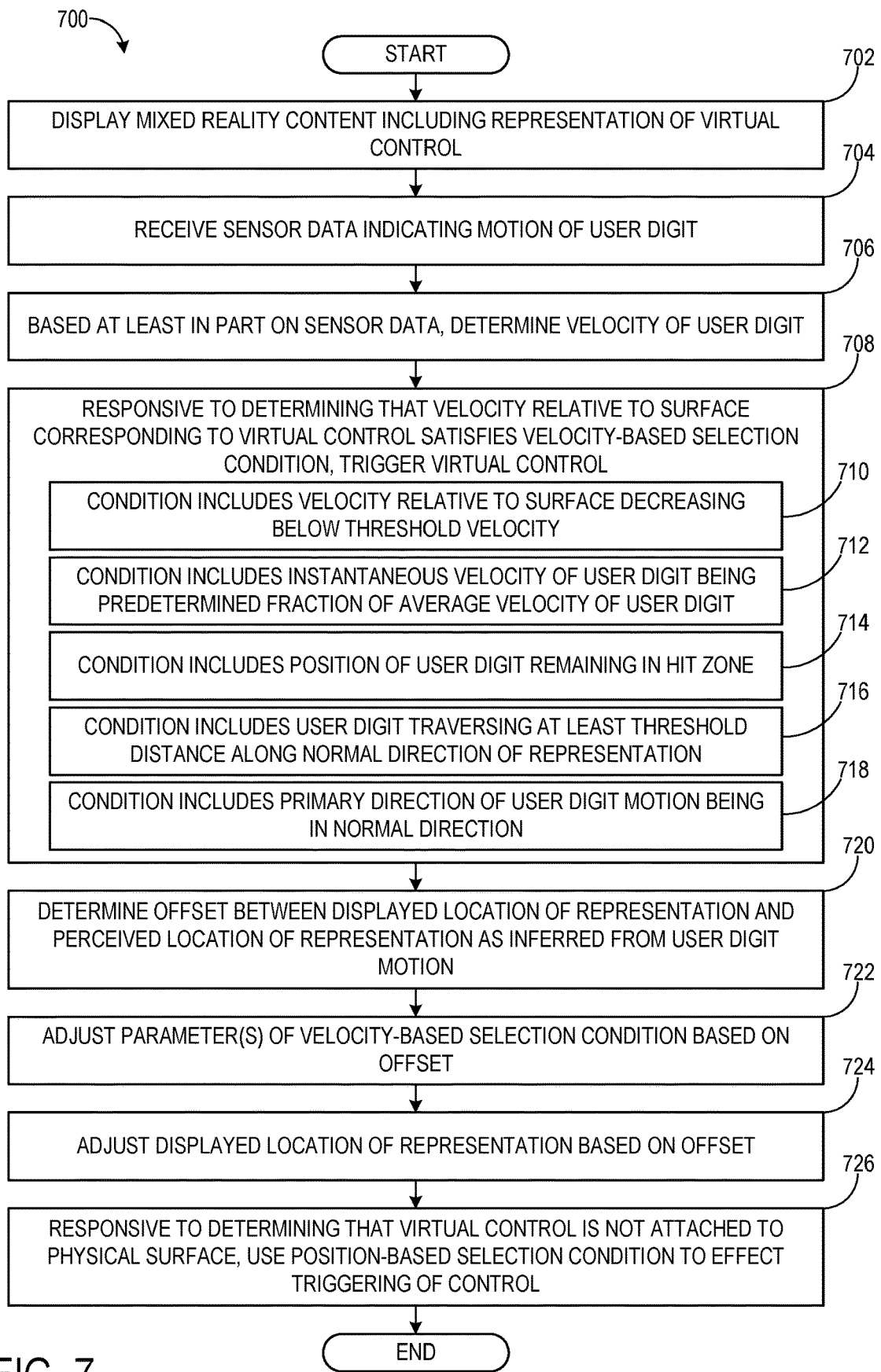
FIG. 7 shows a flowchart illustrating a method for triggering a virtual control.

FIG. 7 shows a flowchart illustrating an example method 700 for triggering a virtual control. Method 700 may be implemented at one or more of the HMD devices described herein, for example.

At 702, method 700 includes, via a mixed reality display device, displaying mixed reality content including a representation of a virtual control. At 704, method 700 includes receiving sensor data indicating motion of a user digit. At 706, method 700 includes, based at least in part on the sensor data, determining a velocity of the user digit.

At 708, method 700 includes, responsive to determining that the velocity of the user digit relative to a surface corresponding to the virtual control satisfies a velocity-based selection condition, triggering the virtual control. The condition may include 710 the velocity of the user digit relative to the surface decreasing below a threshold velocity. The condition may include 712 an instantaneous velocity of the user digit being a predetermined fraction of an average velocity of the user digit. The condition may include 714 a position of the user digit remaining within a hit zone at least partially extruded from the representation of the virtual control. The condition may include 716 the user digit traversing at least a threshold distance along a normal direction of the representation of the virtual control. The condition may include 718 a primary direction of the motion of the user digit being along a normal direction of the representation of the virtual control.

At 720, method 700 includes determining an offset between a displayed location of the representation of the virtual control and a perceived location of the representation of the virtual control, such offset being inferred from the motion of the user digit. At 722, method 700 includes adjusting one or more parameters of the velocity-based selection condition based on the offset. At 724, method 700 includes adjusting the displayed location of the representation of the virtual control based on the offset. At 726, method 700 includes, responsive to determining that the virtual control is not attached to a physical surface, using a position-based selection condition and not the velocity-based selection condition to effect the triggering of the virtual control. Method 700 may further include, responsive to determining that the user digit has traversed at least a threshold distance (e.g., a release distance) away from the representation of the virtual control, releasing the virtual control such that the virtual control is triggerable, and adjusting the threshold distance based on the offset.

It will be understood that the examples disclosed herein may be applied to display devices having at least partially transparent displays, display devices having substantially opaque displays, and non-head-mounted display devices. Further, where aspects of hand/digit motion are interpreted as user input and used to selectively trigger virtual controls, hand motion may be sensed in any suitable manner, such as via an imaging system, from sensor data collected by a hand-manipulated device, and/or via a wearable device. Moreover, any suitable type of hand-related input may be used to selectively trigger virtual controls, including but not limited to input derived from the motion of a user hand or digit, and/or input derived from a handheld input device. Still further, virtual controls in accordance with the present disclosure may assume any suitable form, including one-dimensional, two-dimensional, and time-varying forms. Further examples of virtual controls include but are not limited to buttons rendered on a user hand (e.g., wrist or palm button, a 3×3 button grid rendered on the palm) and buttons rendered on one or more user digits.

As described above, the disclosed approaches may help to align the behavior of virtual controls and other mixed reality content more closely to user perception as inferred from user input. In some examples, the velocity-based selection condition described above may be defined such that a virtual control is triggerable even if a digit position is not collocated with a representation of the control. Further, in some examples the normal distance from a surface at which a virtual control is positioned may include a buffer distance to bias control placement toward being in front of/above the surface rather than behind/below the surface, as placements of the latter type may render a virtual control difficult to trigger. Still further, aspects of the disclosed techniques may be used for purposes other than triggering a virtual control—for example, based on the velocity and/or other motional/kinematic properties of a user digit or other designated input device, a force of the digit may be measured. In some examples, an analog measurement may be taken and used as an input to an application (e.g., to control a volume in an analog manner based on the measurement). Yet still further, triggering a virtual control may include executing corresponding functionality (e.g., code, instructions) assigned to the control and/or changing an appearance or behavior of the control, as described above. However, in some examples, satisfaction of a velocity-based selection condition may not directly trigger a virtual control but place the control in a state in which the satisfaction of additional condition(s) leads to triggering the control. In such examples, satisfaction of a velocity-based selection condition may highlight or select a control, and additional input (e.g., further hand/digit input, voice input, gaze input) satisfying the additional condition(s) may cause the control to be triggered, for example.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
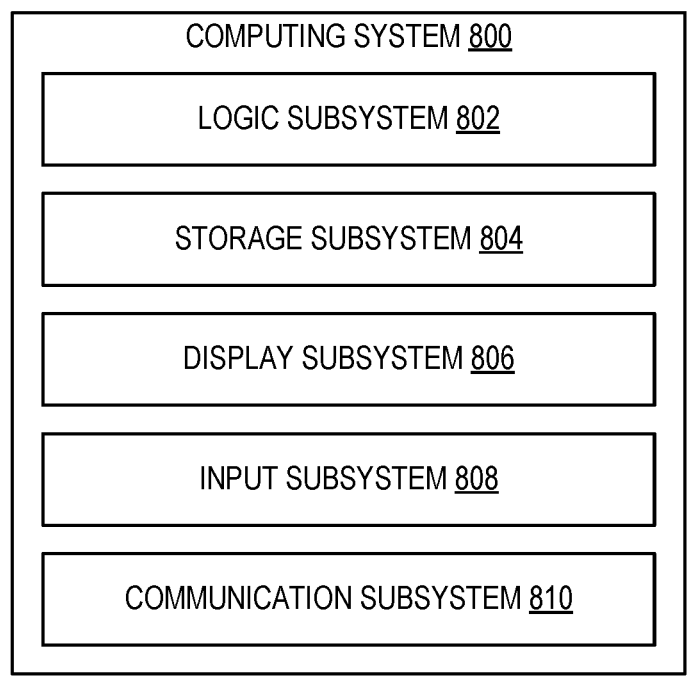
FIG. 8 shows a block diagram of an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic subsystem 802 and a storage subsystem 804. Computing system 800 may optionally include a display subsystem 806, input subsystem 808, communication subsystem 810, and/or other components not shown in FIG. 8.

Logic subsystem 802 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 804 includes one or more physical devices configured to hold instructions executable by the logic subsystem to implement the methods and processes described herein. When such methods and processes are implemented, the state of storage subsystem 804 may be transformed—e.g., to hold different data.

Storage subsystem 804 may include removable and/or built-in devices. Storage subsystem 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 804 may include volatile, nonvolatile, dynamic, static, read/write, read-only, random-access, sequential-access, location-addressable, file-addressable, and/or content-addressable devices.

It will be appreciated that storage subsystem 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 802 and storage subsystem 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic subsystem 802 executing instructions held by storage subsystem 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage subsystem 804. This visual representation may take the form of a graphical user interface (GUI). As the herein described methods and processes change the data held by the storage subsystem, and thus transform the state of the storage subsystem, the state of display subsystem 806 may likewise be transformed to visually represent changes in the underlying data. Display subsystem 806 may include one or more display devices utilizing virtually any type of technology. Such display devices may be combined with logic subsystem 802 and/or storage subsystem 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides a method comprising, via a mixed reality display device, displaying mixed reality content including a representation of a virtual control, receiving sensor data indicating motion of a user digit, based at least in part on the sensor data, determining a velocity of the user digit, and responsive to determining that the velocity of the user digit relative to a surface corresponding to the virtual control satisfies a velocity-based selection condition, triggering the virtual control. In such an example, the velocity-based selection condition may include the velocity of the user digit relative to the surface decreasing by at least a threshold rate. In such an example, the velocity-based selection condition alternatively or additionally may include an instantaneous velocity of the user digit being a predetermined fraction of an average velocity of the user digit. In such an example, determining that the velocity-based selection condition is satisfied may be performed while a position of the user digit is within a hit zone at least partially extruded from the representation of the virtual control. In such an example, the velocity-based selection condition alternatively or additionally may include the user digit traversing at least a threshold distance along a normal direction of the representation of the virtual control. In such an example, the velocity-based selection condition alternatively or additionally may include a primary direction of the motion of the user digit being along a normal direction of the representation of the virtual control. In such an example, the method alternatively or additionally may comprise determining an offset between a displayed location of the representation of the virtual control and a perceived location of the representation of the virtual control, such offset being inferred from the motion of the user digit. In such an example, the method alternatively or additionally may comprise adjusting one or more parameters of the velocity-based selection condition based on the offset. In such an example, the method alternatively or additionally may comprise adjusting the displayed location of the representation of the virtual control based on the offset. In such an example, the method alternatively or additionally may comprise, responsive to determining that the user digit has traversed at least a threshold distance away from the representation of the virtual control, releasing the virtual control such that the virtual control is triggerable, and adjusting the threshold distance based on the offset. In such an example, the method alternatively or additionally may comprise responsive to determining that the virtual control is not attached to a physical surface, using a position-based selection condition and not the velocity-based selection condition to effect the triggering of the virtual control, and responsive to determining that the virtual control is attached to a physical surface, using the velocity-based selection condition and not the position-based selection condition to effect the triggering of the virtual control. In such an example, the virtual control may be a first virtual control attached to a physical surface, and the method alternatively or additionally may comprise displaying a representation of a second virtual control not attached to a physical surface, based at least in part on the sensor data, determining a position of the user digit, and responsive to determining that the position of the user digit relative to a hit zone corresponding to the second virtual control satisfies a position-based selection condition, triggering the second virtual control. In such an example, the surface corresponding to the virtual control may be a surface of the virtual control.

Another example provides a mixed reality display device, comprising a display, a sensor subsystem, a logic subsystem, and a storage subsystem holding instructions executable by the logic subsystem to, via the display, display mixed reality content including a representation of a virtual control, via the sensor subsystem, receive sensor data indicating motion of a user digit, based on the sensor data, determine a velocity of the user digit, and responsive to determining that the velocity of the user digit relative to a surface corresponding to the virtual control satisfies a velocity-based selection condition, trigger the virtual control. In such an example, the velocity-based selection condition may include the velocity of the user digit relative to the surface decreasing below a threshold velocity. In such an example, the velocity-based selection condition alternatively or additionally may include one or more of an instantaneous velocity of the user digit being a predetermined fraction of an average velocity of the user digit, a position of the user digit remaining within a hit zone at least partially extruded from the representation of the virtual control, the user digit traversing at least a threshold distance along a normal direction of the representation of the virtual control, and a primary direction of the motion of the user digit being along a normal direction of the representation of the virtual control. In such an example, the mixed reality display device may alternatively or additionally comprise instructions executable to determine an offset between a displayed location of the representation of the virtual control and a perceived location of the representation of the virtual control, such offset being inferred from the motion of the user digit. In such an example, the mixed reality display device may alternatively or additionally comprise instructions executable to adjust one or more parameters of the velocity-based selection condition based on the offset and/or the displayed location of the representation of the virtual control based on the offset.

Another example provides a method, comprising, via a mixed reality display device, displaying mixed reality content including a representation of a virtual control, the virtual control being attached to a physical surface, receiving sensor data indicating motion of a user digit, based on the sensor data, determining a velocity of the user digit, and responsive to determining that the velocity of the user digit relative to the physical surface satisfies a velocity-based selection condition, triggering the virtual control. In such an example, the method may further comprise determining an offset between a displayed location of the representation of the virtual control and a perceived location of the representation of the virtual control, such offset being inferred from the motion of the user digit, and adjusting the displayed location of the representation of the virtual control based on the offset.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising:
   via a mixed reality display device, displaying mixed reality content including a representation of a virtual control;
   receiving sensor data indicating motion of a user digit;
   responsive to a determination that the virtual control is attached to a physical surface,
   (1) based at least in part on the sensor data, determining a velocity of the user digit relative to the surface to which the virtual control is attached, and
   (2) responsive to determining that the velocity of the user digit relative to the surface satisfies a velocity-based selection condition, triggering the virtual control; and
   responsive to a determination that the virtual control is not attached to the physical surface, using a position-based selection condition and not the velocity-based selection condition to effect the triggering of the virtual control.

2. The method of claim 1, where the velocity-based selection condition includes the velocity of the user digit relative to the surface decreasing by at least a threshold rate.

3. The method of claim 1, where the velocity-based selection condition includes an instantaneous velocity of the user digit being a predetermined fraction of an average velocity of the user digit.

4. The method of claim 1, where determining that the velocity-based selection condition is satisfied is performed while a position of the user digit is within a hit zone at least partially extruded from the representation of the virtual control.

5. The method of claim 1, where the velocity-based selection condition includes the user digit traversing at least a threshold distance along a normal direction of the representation of the virtual control.

6. The method of claim 1, where the velocity-based selection condition includes a primary direction of the motion of the user digit being along a normal direction of the representation of the virtual control.

7. The method of claim 1, further comprising determining an offset between a displayed location of the representation of the virtual control and a perceived location of the representation of the virtual control, such offset being inferred from the motion of the user digit.

8. The method of claim 7, further comprising adjusting one or more parameters of the velocity-based selection condition based on the offset.

9. The method of claim 7, further comprising adjusting the displayed location of the representation of the virtual control based on the offset.

10. The method of claim 7, further comprising, responsive to determining that the user digit has traversed at least a threshold distance away from the representation of the virtual control, releasing the virtual control such that the virtual control is triggerable, and adjusting the threshold distance based on the offset.

11. The method of claim 1, where the virtual control is a first virtual control attached to the physical surface, the method further comprising:
   displaying a representation of a second virtual control not attached to the physical surface;
   based at least in part on the sensor data, determining a position of the user digit; and
   responsive to determining that the position of the user digit relative to a hit zone corresponding to the second virtual control satisfies the position-based selection condition, triggering the second virtual control.

12. The method of claim 1, where the surface to which the virtual control is attached is a surface of the virtual control.

13. The method of claim 1, further comprising using one or more of surface recognition or object recognition to determine that the virtual control is attached to the physical surface or that the virtual control is not attached to the physical surface.

14. A mixed reality display device, comprising:
a display;
a sensor subsystem;
a logic subsystem; and
a storage subsystem holding instructions executable by the logic subsystem to:
via the display, display mixed reality content including a representation of a virtual control;
via the sensor subsystem, receive sensor data indicating motion of a user digit;
responsive to a determination that the virtual control is attached to a physical surface,
(1) based on the sensor data, determine a velocity of the user digit relative to the surface to which the virtual control is attached, and
(2) responsive to determining that the velocity of the user digit relative to the surface satisfies a velocity-based selection condition, trigger the virtual control; and
responsive to a determination that the virtual control is not attached to the physical surface, use a position-based selection condition and not the velocity-based selection condition to effect the triggering of the virtual control.

15. The mixed reality display device of claim 14, where the velocity-based selection condition includes the velocity of the user digit relative to the surface decreasing below a threshold velocity.

16. The mixed reality display device of claim 14, where the velocity-based selection condition includes one or more of:
an instantaneous velocity of the user digit being a predetermined fraction of an average velocity of the user digit;
a position of the user digit remaining within a hit zone at least partially extruded from the representation of the virtual control;
the user digit traversing at least a threshold distance along a normal direction of the representation of the virtual control; and
a primary direction of the motion of the user digit being along a normal direction of the representation of the virtual control.

17. The mixed reality display device of claim 14, further comprising instructions executable to determine an offset between a displayed location of the representation of the virtual control and a perceived location of the representation of the virtual control, such offset being inferred from the motion of the user digit.

18. The mixed reality display device of claim 17, further comprising instructions executable to adjust one or more parameters of the velocity-based selection condition based on the offset and/or the displayed location of the representation of the virtual control based on the offset.

19. A method, comprising:
via a mixed reality display device, displaying mixed reality content including a representation of a virtual control;
receiving sensor data indicating motion of a user digit;
responsive to a determination that the virtual control is attached to a physical surface,
(1) based on the sensor data, determining a velocity of the user digit relative to the physical surface to which the virtual control is attached, and
(2) responsive to determining that the velocity of the user digit relative to the physical surface satisfies a velocity-based selection condition, triggering the virtual control; and
responsive to a determination that the virtual control is not attached to the physical surface, using a position-based selection condition and not the velocity-based selection condition to effect the triggering of the virtual control.

20. The method of claim 19, further comprising:
determining an offset between a displayed location of the representation of the virtual control and a perceived location of the representation of the virtual control, such offset being inferred from the motion of the user digit; and
adjusting the displayed location of the representation of the virtual control based on the offset.

* * * * *